United States Patent
McRobbie et al.

(10) Patent No.: US 12,180,420 B2
(45) Date of Patent: Dec. 31, 2024

(54) COMPOSITIONS AND METHODS AND USES RELATING THERETO

(71) Applicant: INNOSPEC OIL FIELD CHEMICALS LLC, Wilmington, DE (US)

(72) Inventors: Ian Malcolm McRobbie, Chester (GB); Joseph Sustayta, Wilmington, DE (US); Luis Angel Ziga, Jr., Wilmington, DE (US)

(73) Assignee: INNOSPEC OIL FIELD CHEMICALS LLC, Wilmington, DE (US)

( * ) Notice: Subject to any disclaimer, the term of this patent is extended or adjusted under 35 U.S.C. 154(b) by 0 days.

(21) Appl. No.: 18/085,957

(22) Filed: Dec. 21, 2022

(65) Prior Publication Data

US 2023/0140610 A1    May 4, 2023

Related U.S. Application Data

(63) Continuation of application No. 16/628,519, filed as application No. PCT/GB2018/051831 on Jun. 29, 2018, now Pat. No. 11,566,164.

(60) Provisional application No. 62/529,153, filed on Jul. 6, 2017.

(51) Int. Cl.
*C09K 8/584* (2006.01)
*C09K 8/524* (2006.01)

(52) U.S. Cl.
CPC .............. *C09K 8/584* (2013.01); *C09K 8/524* (2013.01); *C09K 2208/20* (2013.01); *C09K 2208/32* (2013.01)

(58) Field of Classification Search
CPC ............ C09K 8/584; C09K 8/524; F17D 1/16
See application file for complete search history.

(56) References Cited

U.S. PATENT DOCUMENTS

| | | |
|---|---|---|
| 2,028,091 A | 1/1936 | Jaeger |
| 2,879,214 A | 3/1959 | Dettmer |
| 3,578,421 A | 5/1971 | Andress, Jr. et al. |
| 3,652,238 A | 3/1972 | Bialy et al. |
| 3,811,846 A | 3/1974 | Schoemer et al. |
| 3,811,848 A | 3/1974 | Johnson |
| 3,917,466 A | 11/1975 | Henry, Jr. |
| 4,010,006 A | 3/1977 | Price |
| 4,200,550 A | 4/1980 | Scherrer et al. |
| 4,222,853 A | 9/1980 | Scherrer et al. |
| 4,252,542 A | 2/1981 | Spence |
| 4,259,087 A | 3/1981 | Naiman et al. |
| 4,333,741 A | 6/1982 | Naiman et al. |
| 4,388,452 A | 6/1983 | Naiman et al. |
| 4,416,668 A | 11/1983 | Thompson |
| 4,491,651 A | 1/1985 | Naiman |
| 4,537,601 A | 8/1985 | Naiman |
| 4,876,018 A | 10/1989 | Karydas |
| 5,110,447 A | 5/1992 | MacWilliams et al. |
| 5,672,183 A | 9/1997 | Schield |
| 5,863,301 A | 1/1999 | Grosso et al. |
| 5,863,466 A | 1/1999 | Mor |
| 6,391,070 B2 | 5/2002 | Schield |
| 6,402,934 B1 | 6/2002 | Chheda et al. |
| 6,793,695 B2 | 9/2004 | Wilkes et al. |
| 8,575,082 B2 | 11/2013 | Asomaning et al. |
| 9,120,885 B2 | 9/2015 | Castro Sotelo et al. |
| 2003/0051395 A1* | 3/2003 | Cox ............... C10G 33/04 44/447 |
| 2008/0200565 A1 | 8/2008 | Harwell et al. |
| 2010/0072427 A1 | 3/2010 | Posselt et al. |
| 2014/0073540 A1 | 3/2014 | Berry et al. |
| 2014/0224495 A1 | 8/2014 | Khandekar et al. |
| 2017/0198204 A1 | 7/2017 | Nguyen et al. |

FOREIGN PATENT DOCUMENTS

| | | |
|---|---|---|
| CN | 104164225 A | 11/2014 |
| EP | 0305612 A1 | 3/1989 |
| WO | 00/06677 A1 | 2/2000 |
| WO | 2017214345 A1 | 12/2017 |

OTHER PUBLICATIONS

International Search Report (ISR) for PCT/GB2018/051831 mailed Oct. 5, 2018 (4 pages).
Written Opinion of the International Search Authority for PCT/GB2018/051831 mailed Oct. 5, 2018 (8 pages).
R. Aveyard et al., "The resolution of water-in-crude oil emulsions by the addition of low molar mass demulsifiers", Journal of Colloid and Interface Sciences, Academic Press, Inc, US, vol. 139, No. 1, p. 128-138, Oct. 1, 1990.
P. Bruheim et al., "Effects of Surfactant Mixtures, Including Corexit 9527, on Bacterial Oxidation of Acetate and Alkanes in Crude Oil", Applied and Environmental Microbiology, p. 1658-1661, Jan. 1, 1999.
P.D. Moran et al., "Vibrational Spectroscopic Study of the Structure of Sodium Bis(2-ethylhexyl)sulfosuccinate Reverse Micelles and Water-in-Oil Microemulsions", Langmuir, vol. 11, p. 738-743, Jan. 1, 1995.
Singh et al., "Surfactants in Microbiology and Biotechnology: Part 2. Application Aspects", Biotechnology Advances, Elsevier Publishing, Barking, GB, vol. 25, No. 1, dated Jan. 18, 2007 (pp. 99-121).

\* cited by examiner

*Primary Examiner* — Aiqun Li
(74) *Attorney, Agent, or Firm* — Shumaker, Loop & Kendrick, LLP

(57) ABSTRACT

A method of reducing the viscosity of a crude oil, the method including adding to the crude oil (i) a surfactant compound including at least two hydrophobic groups wherein the resultant mixture has a water content of less than 10 vol %.

11 Claims, No Drawings

COMPOSITIONS AND METHODS AND USES RELATING THERETO

TECHNICAL FIELD AND BACKGROUND

The present invention relates to compositions suitable for use as additives for crude oil, and to methods and uses relating thereto. In particular the invention relates to the use of additive compositions which modify the viscosity of crude oil.

Crude oil must be transported through pipelines before being converted into useful products. However its high viscosity means that the transport of crude oil through pipelines is difficult, especially in the case of heavy crude oil.

Pumps are typically used to drive crude oil through pipelines. These pumps operate at high pressures and pipelines may be heated. Thus this is an energy intensive process.

Reducing the viscosity of the crude oil at a particular temperature will allow it to be pumped at a lower pressure. Alternatively a greater flow rate can be achieved at the same pressure. This may offer cost savings and environmental benefits.

Many ways of modifying the viscosity of crude oil are known in the art. Various compounds have been added to modify the viscosity including polymer blends (U.S. Pat. No. 4,010,006), organic fluorocarbons (U.S. Pat. No. 4,876,018), amine-chelate complexes (U.S. Pat. No. 6,402,934), alkyl-substituted phenol formaldehyde resins (U.S. Pat. No. 8,575,082) and random acrylate based copolymers and terpolymers (U.S. Pat. No. 9,120,885).

U.S. Pat. No. 5,863,301 describes the formation of an emulsion with water to improve the flow characteristics of crude oil. These emulsions comprise 60 to 85% oil and 15 to 40% water and a combination of emulsifiers is used. One suitable anionic emulsifier is dioctyl sulfosuccinate. The compositions typically comprise 25% or more of water.

Dioctyl sulfosuccinate has also been added to crude oil as a demulsifier during the desalting process (U.S. Pat. No. 4,200,550) and as an anti-fouling agent (U.S. Pat. No. 4,222,853).

SUMMARY

The present invention seeks to provide an alternative means for reducing the viscosity of crude oil, especially heavy crude oil and in particular heavy crude oil having a low water content.

DETAILED DESCRIPTION

According to a first aspect of the present invention there is provided a method of reducing the viscosity of a crude oil, the method comprising adding to the crude oil (i) a surfactant compound including at least two hydrophobic groups, wherein the resultant mixture has a water content of less than 10 vol %.

Any grade of crude oil may be treated according to the method of the first aspect.

The present invention is especially suitable for the treatment of heavy crude oils.

Preferably the crude oil to be treated according to the invention has an initial API gravity of 25 or lower, suitably 23 or lower, preferably 22.3 or lower, more preferably 22 or lower, for example 21 or lower, or 20 or lower.

Suitably the crude oil has an API gravity of at least 10, for example at least 12.

Suitably the crude oil to be treated accordingly to the invention an initial API gravity of 10 to 25, preferably 12 to 20.

Heavy crude oils are typically very viscous.

Suitably the crude oil to be treated according to the present invention has an initial viscosity at 20° C. of at least 500 cP, for example at least 1250 cP.

The present invention is especially suitable for the treatment of crude oils having a low water content. Preferably the crude oil treated according to the invention has a basic sediment and water (BS&W) content of less than 10% by volume, preferably less than 5%, more preferably less than 4%, suitably less than 3%, preferably less than 2.5%, more preferably less than 2%.

The resultant mixture has a water content of less than 10 vol %. By this we mean that the composition formed following admixture of the additive composition with the crude oil has a water content of less than 10% by volume. Preferably the resultant mixture has a water content of less than 5 vol %, preferably less than 4 vol %, suitably less than 3 vol %, preferably less than 2.5 vol %, more preferably less than 2 vol %.

In the method of the present invention (i) a surfactant compound including at least two hydrophobic groups is added to the fuel. The surfactant compound includes at least two hydrophobic groups. By hydrophobic groups we mean to refer to groups which are predominantly hydrophobic in nature and do not include a significant proportion of hydrophilic moieties.

Preferred hydrophobic groups are hydrocarbyl groups, especially alkyl and alkenyl groups.

Preferably compound (i) is a surfactant compound including at least two hydrocarbyl groups, preferably having at least 4 carbon atoms, suitably at least 6 carbon atoms.

Preferably compound (i) is a surfactant compound including at least two alkyl groups, preferably at least two alkyl groups having at least 4 carbon atoms.

Preferably compound (i) is a surfactant compound including at least two $C_4$ to $C_{40}$ alkyl groups and a polar group.

The polar group may be a cationic group or an anionic group.

Suitable cationic groups include ammonium ions.

Suitable anionic groups include sulfonate groups groups and carboxylate groups.

Component (i) comprises at least two hydrophobic groups. In some embodiments component (i) may comprise more than two hydrophobic groups, for example three or more hydrophobic groups.

Preferably component (i) comprises two hydrophobic groups.

Preferably component (i) is a surfactant compound comprising two alkyl groups having 4 to 40, preferably 6 to 36 carbon atoms and a polar group.

Preferably component (i) comprises two alkyl groups having 4 to 30 carbon atoms, preferably 4 to 24 carbon atoms, more preferably 6 to 20 carbon atoms.

Component (i) is preferably selected from sulfonated and/or carboxylated di and/or triesters of polycarboxylic acids: and dialkyl and/or trialkyl ammonium salts.

In some embodiments component (i) comprises a dialkyl ammonium or trialkyl ammonium salts.

Dialkyl ammonium salts are preferred.

Compounds of this type typically have the formula $(R^2)_2 N^+Me_2X^-$ wherein X is an anion, preferably halide, for example chloride or bromide.

Preferably each $R^2$ is a $C_4$ to $C_{10}$, preferably a $C_6$ to $C_{36}$ alkyl or alkenyl group, preferably a $C_{10}$ to $C_{30}$ alkyl group.

Preferred dialkyl ammonium salts include dioctadecyldimethyl ammonium bromide and didodecyl dimethyl ammonium bromide.

In some embodiments compound (i) comprises a diester and/or a triester of a polycarboxylic acid.

The polycarboxylic acid is sulfonated and/or carboxylated. By this we mean that the polycarboxylic acid includes one or more sulfonate $SO_3X$ or carboxylate COOX moieties wherein X is a cation, suitably hydrogen, ammonium or a metal ion, preferably an ammonium, alkaline earth metal or alkali metal ion, preferably sodium.

Preferred surfactant compounds (i) of this type are diesters of sulfonated dicarboxylic acids.

Diesters of sulfonated dicarboxylic acids are known in the art for example those taught in U.S. Pat. Nos. 2,879,214 and 2,028,091.

Suitable sulfonated dicarboxylic acids include those of formula:

$$MO_3S-R'\begin{matrix}COOR\\COOR\end{matrix}$$

wherein each R is an optionally substituted hydrocarbyl group, M+ is an ammonium ion or metal ion and R' is an aliphatic or aromatic hydrocarbyl radical, preferably an aliphatic hydrocarbyl radical, preferably a radical of formula $(C_nH_{2n-1})$ wherein n=1 to 8, preferably 2 to 8.

Suitable dicarboxylic acids include succinic acid, phthalic acid, glutaric acid, adipic acid, pimelic acid, suberic acid, azelaic acid, sebacic acid and methyl succinic acid.

Preferred dicarboxylic acids include succinic acid, methyl succinic acid and glutaric acid.

Preferably the dicarboxylic acid is succinic acid.

In preferred embodiments component (i) comprises a sulfosuccinate ester:

The sulfosuccinate ester is preferably a compound of formula (I):

(I)

$$M^+{}^-O_3S\overset{O}{\underset{O}{\diagdown}}\begin{matrix}OR\\OR\end{matrix}$$

wherein each R is an optionally substituted hydrocarbyl group and M+ is a hydrogen ion, an ammonium ion or a metal ion.

Preferably each R is an optionally substituted hydrocarbyl group. Each R may be the same or different. Preferably each R is an unsubstituted hydrocarbyl group.

Preferably each R is an optionally substituted alkyl, aralkyl, alkaryl, alkenyl or aryl group.

Preferably each R has 1 to 40, more preferably 1 to 30, suitably 2 to 20, preferably 2 to 16 carbon atoms.

Preferably each R is an unsubstituted alkyl, aralkyl, alkaryl or aryl group, more preferably an unsubstituted alkyl, aralkyl, alkaryl or aryl group.

Preferably each R is an unsubstituted alkyl group. Preferably each R is an unsubstituted alkyl group having 1 to 40, preferably 1 to 30, more preferably 1 to 24 carbon atoms. Preferably each R is an unsubstituted alkyl group having 2 to 20, preferably 2 to 16, more preferably 4 to 12, for example 6 to 10 carbon atoms.

Each alkyl group R may be straight chain or branched.

Preferably each R is a branched alkyl group having 2 to 20, preferably 4 to 12 carbon atoms. Preferably each R is the same.

Most preferably each R is 2-ethylhexyl.

M+ is a hydrogen ion, an ammonium ion or a metal ion, Preferably M+ is an ammonium ion or a metal ion. Suitable ammonium ions include alkyl substituted ammonium ions but $NH_4^+$ is preferred. Most preferably M+ is a metal. Suitable metals include alkali metal and alkaline earth metals. Alkali metal ions are preferred. Most preferably M+ is a sodium ion.

Thus in especially preferred embodiments component (i) comprises the compound of formula (II):

(II)

$$Na^+{}^-O_3S\overset{O}{\underset{O}{\diagdown}}\begin{matrix}O-CH(C_2H_5)C_4H_9\\O-CH(C_2H_5)C_4H_9\end{matrix}$$

In some preferred embodiments the method of the first aspect may include adding one or more further components to the crude oil. Preferably the one or more further components are selected from:

(ii) oxyalkylated phenolic resins;
(iii) polyoxyalkylene ethers;
(iv) aryl sulfonic acid compounds;
(v) alkoxylated amines;
(vi) polyol esters;
(vii) polysulfones; and
(viii) conductivity improvers.

In some preferred embodiments the method involves adding component (i) and component (ii).

In some preferred embodiments the method involves adding component (i) and component (iii).

In some especially preferred embodiments the method involves adding component (i), component (ii) and component (iii).

In embodiments in which one or more further components (ii) to (viii) are added to the crude oil these may be adding separately from component (i) or in combination. Two or more components may be added together and one or more others added separately in any combination. Preferably all of the components are added together in a single additive composition. The additive composition may further comprise one or more diluents or carriers.

Suitable diluents and carriers will be known to the person skilled in the art and include aromatic solvents for example xylene, toluene, aromatic 100, aromatic 150; aliphatic solvents, for example VM&P naphtha, kerosene, diesel; and oxygenated solvents, for example alcohols, glycols, ethers and glycol ethers.

Component (ii) is an oxyalkylated phenolic resin.

Suitably component (ii) is a phenolic resin which has been reacted with one or more alkylene oxides. The phenolic resin is preferably prepared by the condensation of formaldehyde and an optionally substituted phenol.

Preferably the phenol is an alkyl substituted phenol.

Preferably the alkyl phenol is a $C_4$ to $C_{30}$ alkyl substituted phenol, preferably a $C_6$ to $C_{24}$ alkyl phenol, more preferably a $C_6$ to $C_{20}$ alkyl phenol, suitably a $C_6$ to $C_{16}$ alkyl phenol, preferably a $C_6$ to $C_{12}$ alkyl phenol.

Most preferably the alkyl phenol is a butyl phenol or a nonyl phenol, preferably a nonyl phenol.

Preferably the formaldehyde-phenol resin is reacted with 10 wt %-500 wt %, suitable 10 wt %-300 wt % preferably 10 wt % to 100 wt % more preferably 10 wt % to 75 wt % of alkylene oxide. Preferably the alkylene oxide is one or more of ethylene oxide, propylene oxide or butylene oxide, preferably ethylene oxide or propylene oxide. When more than one alkylene oxide is used the compound may be a random copolymer or a block copolymer.

Component (iii) is a polyoxyalkylene ether.

Component (iii) suitably comprises polyoxyalkylene ether of a polyhydric alcohol. Preferably component (iii) comprises a polyoxyalkylene ether of a sugar alcohol. For example component (iii) may comprise a polyoxyalkylene ether of a sugar alcohol selected from sorbitol, erythritol, glycerol, mannitol and xylitol.

Preferably component (iii) is a polyoxyalkylene ether of sorbitol.

Preferably each oxyalkylene group has 1 to 10 carbon atoms, preferably 2 to 8 carbon atoms, more preferably 2 to 6 carbon atoms, suitably 2 to 4 carbon atoms and most preferably 2 or 3 carbon atoms.

Preferably the alkylene unit of each oxyalkylene group is ethylene or propylene. The propylene groups may be $CH_2CH_2CH_2$ or $(CH_3)CHCH_2$. Preferably the propylene groups are $(CH_3)CHCH_2$.

Each alkylene group may be the same or different. When each alkylene group is not the same, component (iii) may comprise a block copolymer or a random copolymer. Block copolymers are preferred.

Preferably component (iii) is prepared from ethylene oxide and/or propylene oxide.

Preferably component (iii) is a polyoxyalkylene ether of a sugar alcohol. Preferably each molecule of the ether comprises from 1 to 100 oxyalkylene units per sugar alcohol unit, preferably from 1 to 50 oxyalkylene units per sugar alcohol unit, more preferably from 6 to 30 oxyalkylene units per sugar alcohol unit.

Preferably component (iii) comprises an ether of sorbitol and from 1 to 60, preferably 6 to 30 ethylene oxide and/or propylene oxide derived units.

Component (iv) is an aryl sulfonic acid compound.

Preferred compounds of this type are optionally substituted benzene sulfonic acids, naphthalene sulfonic acids and salts thereof.

Suitably component (iv) comprises an alkyl substituted benzene sulfonic acid or a salt thereof.

Suitably the alkyl group has 4 to 40 carbon atoms, preferably 6 to 30 carbon atoms, more preferably 6 to 24 carbon atoms, suitably 6 to 18 carbon atoms, preferably 8 to 16 carbon atoms, for example 10 to 14 carbon atoms.

In some embodiments component (iv) comprises dodecyl benzene sulfonic acid or a salt thereof.

Suitable salts of aryl sulfonic acids include alkali metal, alkaline earth metal, ammonium and substituted ammonium salts.

One preferred salt is a monoethanolamine salt.

Preferably component (iv) comprises dodecyl benzene sulfonic acid or the monoethanolamine salt thereof.

Component (v) is an alkoxylated amine. Preferably component (v) is an alkoxylated polyamine. Suitably component (v) is an alkoxylated alkylene polyamine, preferably an alkoxylated ethylene polyamine.

Preferably component (v) is an alkoxylated amine selected from ethylenediamine, diethylenetriamine, triethylenetetramine, tetraethylenepentamine, pentaethylenehexamine, hexaethyleneheptamine, heptaethyleneoctamine, propane-1,2-diamine, 2(2-amino-ethylamino)ethanol, and $N^1,N^1$-bis (2-aminoethyl) ethylenediamine ($N(CH_2CH_2NH_2)_3$). Most preferably component (v) is an alkoxylated tetraethylenepentamine.

Preferably component (v) is an alkoxylated amine, preferably component (v) is a polyalkoxylated polyamine.

Preferably each oxyalkylene group has 1 to 10 carbon atoms, preferably 2 to 8 carbon atoms, more preferably 2 to 6 carbon atoms, suitably 2 to 4 carbon atoms and most preferably 2 or 3 carbon atoms.

Preferably the alkylene unit of each oxyalkylene group is ethylene or propylene. The propylene groups may be $CH_2CH_2CH_2$ or $(CH_3)CHCH_2$. Preferably the propylene groups are $(CH_3)CHCH_2$.

Each alkylene group may be the same or different. When each alkylene group is not the same, component (v) may comprise a block copolymer or a random copolymer. Block copolymers are preferred.

Preferably component (v) is prepared from ethylene oxide and/or propylene oxide.

Preferably component (v) is a polyoxyalkylene amine comprising from 1 to 100 oxyalkylene units per polyamine unit, preferably from 1 to 50 oxyalkylene units per polyamine unit, more preferably from 1 to 30 oxyalkylene units per polyamine unit.

Component (vi) is a polyol ester. Preferably component (vi) is an ester of a sugar alcohol and a fatty acid. More preferably component (vi) is an alkyoxylated ester of a sugar alcohol and a fatty acid, suitably a polyalkyoxylated ester of a sugar alcohol and a fatty acid.

Suitably component (vi) is prepared by reacting a fatty acid with a sugar alcohol and then optionally reacting the resultant ester with one or more units of alkylene oxide.

The fatty acid is suitably reacted with the sugar alcohol in an approximate 1:1 molar ratio.

The fatty acid suitable has the formula $R^1COOH$, wherein wherein $R^1$ is a hydrocarbyl group, preferably an alkyl group, preferably having at least 4, suitably at least 6 carbon atoms.

Suitably the fatty acid may be selected from docosahexaenoic acid, erucic acid, eicosapentaenoic acid, arachidonic acid, linolenic acid, linoeaidic acid, linoleic acid, vaccenic acid, elaidic acid, oleic acid, sapienic acid, palmitoleic acid, myristoleic acid, caprylic acid, capric acid, lauric acid, myristic acid, palmitic acid, stearic acid, arachidic acid, behenic acid, lignoceric acid and cerotic acid.

Preferred fatty acids are saturated fatty acids, especially C10 to C24 fatty acid.

The ester of the fatty acid and the sugar alcohol may be further reacted with one or more oxyalkylene groups.

Preferably each oxyalkylene group has 1 to 10 carbon atoms, preferably 2 to 8 carbon atoms, more preferably 2 to 6 carbon atoms, suitably 2 to 4 carbon atoms and most preferably 2 or 3 carbon atoms.

Preferably the alkylene unit of each oxyalkylene group is ethylene or propylene. The propylene groups may be $CH_2CH_2CH_2$ or $(CH_3)CHCH_2$. Preferably the propylene groups are $(CH_3)CHCH_2$.

Each alkylene group may be the same or different. When each alkylene group is not the same, component (vi) may comprise a block copolymer or a random copolymer. Block copolymers are preferred.

Preferably component (vi) is prepared from ethylene oxide and/or propylene oxide.

Preferably component (vi) is a polyol ester comprising from 1 to 100 oxyalkylene units per ester unit, preferably from 1 to 50 oxyalkylene units per ester unit, more preferably from 6 to 30 oxyalkylene units per ester unit.

Component (vii) comprises a copolymer of one or more alkenes and sulphur dioxide, referred to as a polysulfone.

The polysulfones of component (vii) can be prepared by methods known in the art (see for example, Encyclopedia of Polymer Science and Technology Vol. 9, Interscience Publishers, page 460 et seq.) or by processes such as those described in U.S. Pat. Nos. 3,917,466, 4,416,668 and US 2010/072427.

Component (vii) suitably has the structure —R—$SO_2$—R—$SO_2$—R—$SO_2$—R— where R represents an alkene-derived moiety.

Preferred alkenes are one or more linear or branched 1-alkenes having from 2 to 36 carbon atoms. Typically, the copolymers (polysulfones) are alternating 1:1 copolymers in which one sulphone unit generally follows one alkene unit; it is also possible for sequences of two or more alkene units to occur in small amounts. Some of the alkene monomers may be replaced by ethylenically unsaturated carboxylic acids (e.g. acrylic acid, methacrylic acid or vinylacetic acid) or ethylenically unsaturated dicarboxylic acids (e.g. maleic acid or fumaric acid) or derivatives thereof (e.g. maleic anhydride), so that the copolymer is formed especially from 50 mol % of sulfur dioxide or sulfone units, from 40 to 50 mol % of alkene units and from 0 to 10 mol % of units from said ethylenically unsaturated carboxylic acids, ethylenically unsaturated dicarboxylic acids or derivatives thereof.

Useful branched and especially linear 1-alkenes having from 2 to 36 carbon atoms include, for example, ethene, propene, 1-butene, 2-butene, isobutene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene or mixtures thereof. Particular preference is given to linear 1-alkenes having from 6 to 16 carbon atoms, especially having from 8 to 14 carbon atoms, or linear 1-alkenes having from 12 to 22 carbon atoms, especially from 14 to 20 carbon atoms, and also mixtures thereof, for example a mixture of 1-dodecene and 1-tetradecene. It may also be advantageous to use mixtures of low molecular weight and high molecular weight 1-alkenes, i.e. 1-alkene mixtures with a bimodal distribution, for example mixtures of 1-alkenes having from 6 to 13 carbon atoms and 1-alkenes having from 14 to 20 carbon atoms, or mixtures of 1-alkenes having from 6 to 10 carbon atoms and 1-alkenes having from 11 to 15 carbon atoms, or mixtures of 1-alkenes having from 2 to 24 carbon atoms and a single 1-alkene having from 4 to 10 carbon atoms. A particularly preferred alkene is 1-decene.

In one preferred embodiment, the weight average molecular weight of the polysulfone component (vii) is from 1000 to 1500000, preferably from 10000 to 990000, and more preferably from 100000 to 500000.

In another preferred embodiment, the number average molecular weight of the polysulfone is from 2000 to 1000000, preferably from 4000 to 100000, more preferably from 6000 to 25000. The molecular weight of polysulfone component (vii) may be determined by any suitable method, for example by light scattering or by determination of the inherent viscosity as described in U.S. Pat. No. 3,917,466 or by gel permeation chromatography.

In certain preferred embodiments component (vii) is a composition comprising both a polyamine component and a polysulfone component.

The polyamine component is preferably the reaction product of epichlorohydrin with an aliphatic primary monoamine or N-aliphatic hydrocarbyl alkylene diamine.

Preferred diamines are alkyl or alkenyl diamines of the general formula:

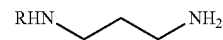

wherein R is preferably selected from an alkyl or alkenyl straight chain group of mainly $C_8$ to $C_{18}$ (coca propylene diamine); a straight chain alkyl group of mainly $C_{16}$ to $C_{22}$ ($C_{16-22}$ alkylpropylene diamine); a straight chain alkyl group of mainly $C_{16}$ to $C_{18}$ (tallow propylene diamine). Most preferably R represents an alkyl or alkenyl straight chain of mainly $C_{18}$ and the amine is oleyl (vegetable oil) propylene diamine.

In some embodiments, a polysulfone-polyamine composition for use as component (vii) may comprise further components, for example a soluble sulfonic acid, a viscosity modifier or a solvent. A preferred solvent is an aromatic solvent, for example benzene optionally substituted by from 1 to 3 C(1-4) alkyl groups.

A preferred component (vii) further comprises a strong acid, preferably an oil-soluble sulfonic acid. Preferred sulfonic acids include dodecyl benzene sulfonic acid and dinonylnapthalene sulfonic acid.

In some preferred embodiments, component (vii) further comprises a quaternary ammonium compound, as described in U.S. Pat. No. 3,811,848

A preferred composition for use as component (vii) comprises an olefin-sulfur dioxide copolymer, preferably in combination with: a polymeric polyamine; or an oil soluble sulfonic acid; or with a polymeric polyamine and an oil soluble sulfonic acid.

Component (viii) comprises a conductivity improver.

By "conductivity improvers" we mean to include additives previously known for their utility as conductivity improvers. Preferred additives in this class include: aliphatic amines-fluorinated polyolefins (U.S. Pat. No. 3,652,238); polysulfone and quaternary ammonium salt (U.S. Pat. No. 3,811,848); polysulfone and quaternary ammonium salt amine/epichlorhydrin adduct sulphonic acid (U.S. Pat. No. 3,917,466); copolymer of an alkyl vinyl monomer and a cationic vinyl monomer (U.S. Pat. No. 5,672,183); methyl vinyl ether-maleic anhydride copolymers and amines (U.S. Pat. No. 3,578,421); alpha-olefin-acrylonitrile (U.S. Pat. Nos. 4,333,741 & 4,388,452); alpha-olefin-acrylonitrile copolymers and polymeric polyamines (U.S. Pat. No. 4,259,087); copolymer of an alkylvinyl monomer and a cationic vinyl monomer and polysulphone (U.S. Pat. No. 6,391,070); an ethoxylated quaternary ammonium compound (U.S. Pat. No. 5,863,466); hydrocarbyl monoamine or hydrocarbyl-substituted polyalkyleneamine (U.S. Pat. No. 6,793,695); acrylic-type ester-acrylonitrile copolymer and polymeric polyamine (U.S. Pat. Nos. 4,537,601 & 4,491,651); and diamine succinamide reacted with an adduct of a ketone and SO2 (β-sultone chemistry) (U.S. Pat. No. 4,252,542). The entire teachings of these patents are incorporated herein by reference.

In the method of the present invention component (i) and optionally one or more of components (ii) to (viii) can be added to the crude oil at any point. For example the one or more components can be added downhole, in pipeline or in storage.

Preferably component (i) and optionally one or more of components (ii) to (viii) are added close to the well head as this allows reduction in viscosity as the oil is transported away from the well.

According to a second aspect of the present invention there is provided a crude oil composition comprising:
(i) a sulfosuccinate ester; and
optionally one or more further components selected from
(ii) oxyalkylated phenolic resins;
(iii) polyoxyalkylene ethers;
(iv) aryl sulfonic acid compounds;
(v) alkoxylated amines;
(vi) polyol esters;
(vii) polysulfones; and
(viii) conductivity improvers
wherein the composition has a water content of less than 10 vol %.

Preferably the composition of the second aspect is prepared by the method of the first aspect. Preferred features of the second aspect are as defined in relation to the first aspect. Further preferred features of the first and second aspects will now be defined.

The composition of the second aspect (suitably a composition provided by the first aspect) preferably comprises at least 1 ppm of component (i), preferably at least 5 ppm, more preferably at least 10 ppm.

Preferably the composition of the second aspect comprises at least 20 ppm of component (i), preferably at least 30 ppm, suitably at least 50 ppm, for example at least 90 ppm or at least 100 ppm.

The composition of the second aspect may comprise up to 1000 ppm of component (i), suitably up to 750 ppm, preferably up to 500 ppm, more preferably up to 400 ppm, suitably up to 300 ppm, for example 250 ppm or up to 200 ppm.

Component (i) may comprise a mixture of components. In such embodiments the above amounts refer to the total amount of all such components present in the composition.

Preferably the composition comprises at least 1 ppm, preferably at least 5 ppm, suitably at least 10 ppm, preferably at least 30 ppm, suitably at least 50 ppm; for example at least 70 ppm of one or more further components selected from:
(ii) oxyalkylated phenolic resins;
(iii) polyoxyalkylene ethers;
(iv) aryl sulfonic acid compounds;
(v) alkoxylated amines;
(vi) polyol esters;
(vii) polysulfones; and
(viii) conductivity improvers.

The one or more further components are suitably present in an amount of up to 1000 ppm, suitably up to 50 ppm, preferably up to 300 ppm, for example up to 200 ppm.

The above amounts refer to the total amount of all components (ii), (iii), (iv), (v), (vi), (vii) and (viii) present in the composition.

In this specification, unless otherwise indicated ppm refers to parts per million by volume.

Components (ii), (iii), (iv), (v), (vi), (vii) and (viii) may each comprise a mixture of compounds. In such embodiments the above amounts refer to the total amount components present in the composition.

It will also be appreciated that each of components (i) to (viii) may be provided dissolved in a diluent or carrier. For the avoidance of doubt the above amounts refer to the amount of active additive present in the composition.

Preferably the composition of the present invention comprises component (ii).

Preferably the composition comprises component (iii).

Preferably the composition comprises component (ii) and component (iii).

The composition of the second aspect (suitably a composition provided by the first aspect) of the present invention preferably comprises at least 1 ppm of component (ii), preferably at least 5 ppm, more preferably at least 10 ppm.

Suitably the composition of the second aspect comprises at least 20 ppm of component (ii), suitably at least 30 ppm, for example at least 40 ppm or at least 50 ppm.

The composition of the second aspect may comprise up to 500 ppm of component (ii), suitably up to 400 ppm, preferably up to 300 ppm, for example up to 200 ppm, up to 150 ppm or up to 100 ppm.

Suitably the composition of the second aspect comprises at least 20 ppm of component (iii), suitably at least 30 ppm, for example at least 40 ppm or at least 50 ppm.

The composition of the second aspect may comprise up to 500 ppm of component (iii), suitably up to 400 ppm, preferably up to 300 ppm, for example up to 200 ppm, up to 150 ppm or up to 100 ppm.

Suitably the composition of the second aspect of the present invention comprises:
from 10 to 200 ppm of (i) a sulfosuccinate ester;
from 5 to 100 ppm of (ii) oxyalkylated phenolic resin; and
from 5 to 100 ppm of (iii) polyoxyalkylene ether;
wherein the composition comprises less than 5 vol % water.

Preferably the weight ratio of component (i) to (ii) is at least 0.5:1, preferably at least 1:1, more preferably at least 1.5:1.

Preferably the weight ratio component (i) to (ii) may be up to 10:1, preferably up to 8:1, more preferably up to 5:1, suitably up to 3:1.

Preferably the weight ratio of component (i) to (iii) is at least 0.5:1, preferably at least 1:1, more preferably at least 1.5:1.

Preferably the weight ratio component (i) to (iii) may be up to 10:1, preferably up to 8:1, more preferably up to 5:1, suitably up to 3:1.

The weight ratio of component (ii) to (iii) is preferably from 1:10:10:1, preferably 1:5:5:1, more preferably from 1:2:2:1, suitably from 1.5:1:1:1.5.

The crude oil composition of the second aspect of the present invention may further comprise one or more additional components present in addition to component (i) and components (ii), (iii), (iv), (v), (vi), (vii) or (viii) when present. Such additional components may be additives known in the petroleum industry to provide a particular benefit, for example biocides, scale inhibitors, corrosion inhibitors, oxygen scavengers, hydrogen sulfide scavengers etc. The additional components may be added separately to the crude oil. The additional components may be added as a part of the method of the first aspect. The additional components may be added as part of an additive composition together with component (i) and optionally one or more of components (ii) to (vii).

According to a third aspect of the present invention there is provided an additive composition comprising (i) a sulfosuccinate ester; and one or more of:
(ii) oxyalkylated phenolic resins;
(iii) polyoxyalkylene ethers;
(iv) aryl sulfonic acid compounds;
(v) alkoxylated amines;
(vi) polyol esters;
(vii) polysulfones; and
(viii) conductivity improvers.

Preferably the additive composition comprises component (ii) and component (iii).

Preferably the additive composition further comprises a diluent or carrier. Suitable diluents and carriers are as defined in relation to the first aspect.

Preferably the additive composition comprises:
from 1 to 50 wt %, preferably 10 to 40 wt %, more preferably 15 to 25 wt %, suitably from 18 to 22 wt % of component (i);
from 1 to 30 wt %, preferably 2 to 20 wt %, more preferably 5 to 15 wt %, suitably 8 to 12 wt % of component (ii);
from 1 to 30 wt %, preferably 2 to 20 wt %, more preferably 5 to 15, suitably 8 to 12 wt % of component (iii); and
from 10 to 90 wt %, preferably 20 to 80 wt %, more preferably 40 to 60 wt % of a diluent or carrier.

Further preferred features of the additive composition of the third aspect are as defined in relation the first and second aspects.

Suitably in the method of the first aspect the additive composition is added to the crude oil in an amount sufficient to provide a composition as defined in relation to the second aspect.

According to a fourth aspect of the present invention there is provided the use of (i) a surfactant compound including at least two hydrophobic groups to reduce the viscosity of a crude oil composition.

Preferred features of the fourth aspect of the present invention are as defined in relation to the first, second and third aspects.

Preferably the fourth aspect provides the use of (i) a sulfosuccinate ester in combination with (ii) an oxyalkylated phenolic resin and/or (iii) a polyoxyalkylene ether to reduce the viscosity of a crude oil composition.

In preferred embodiments the fourth aspect of the present invention provides the use of (i) a sulfosuccinate ester to reduce the viscosity of a crude oil composition having an API gravity of less than 20 and a BS&W of less than 2 vol %.

Suitably the fourth aspect provides the use of (i) a sulfosuccinate ester; (ii) an oxyalkylated phenolic resin; and (iii) a polyoxyalkylene ether to reduce the viscosity of a crude oil composition having an API gravity of less than 20 and a BS&W of less than 2 vol %.

The method and use of the present invention reduce the viscosity of a crude oil by the addition of (i) a surfactant compound including at least two hydrophilic groups and optionally one or more further components.

Suitably the method and use of the present invention reduce the viscosity of a crude oil composition by at least 5%, preferably at least 10%, suitably at least 15%, for example at least 20% compared with the viscosity of the unadditised crude oil composition.

Suitably the composition of the second aspect has a viscosity which is at least 5%, preferably at least 10%, more preferably at least 15%, for example at least 20% less than that of the unadditised composition.

The reduction in viscosity is suitably achieved comparing measurements at the same temperature.

Viscosity may be measured by any suitable method. Such methods will be known to the person skilled in the art. One suitable method is by using a Brookfield viscometer.

Advantageously the present invention has been found to reduce viscosity at 60° C. Fuels may be heated to this temperature to assist flow through pipelines.

Suitably the method and use of the present invention reduce the viscosity at 60° C. of the crude oil composition.

Suitably the method and use of the present invention reduces the viscosity at 60° C. of the crude oil composition by at least 5%, preferably at least 8%, more preferably at least 10%, suitably at least 12%, preferably at 15%.

In some embodiments the method and use of the present invention may reduce the viscosity of the crude oil at 60° C. by at least 20%, for example at least 25%, or at least 30%.

In some embodiments the method and use of the present invention reduce the viscosity of crude oil at 60° C. by 50% or more.

Preferably the method and use of the present invention reduces the viscosity at 60° C. of a crude oil composition having an API gravity of less than 20 and a BS&W of less than 2 vol % by at least 10%, preferably at least 15%, suitably at least 20%, for example at least 25%.

To achieve an improvement in viscosity at 60° C., the method of the invention may involve adding component (I) and optional further components to the fuel at 60° C.

Alternatively addition of the components may be carried out at a different temperature but when viscosity is measured at 60° C. before and after addition, a reduction is seen following addition of the components.

The invention will now be further described with reference to the following non-limiting examples.

Example 1

Samples of Mexican crude oil having an API gravity of 15 (SG 0.9659) and a BS&W of 0.9% by volume were tested according to the procedure set out below.

Procedure:
1. Heat up a water bath to 60° C.
2. Shake oil sample to homogenize.
3. Pour 500 mL of oil sample into glass graduated beakers.
4. Place glass beakers with sample in the water bath and monitor temperature until sample reaches 40° C. or 60° C.
5. While inside the water bath, dose glass beakers with test additive compositions.
6. Using a metal spatula, stir-mix the chemical into the oil sample.
7. Use a Brookfield LU Viscometer to obtain readings for Viscosity (cP), RPM, & Torque %

The following additives were tested of the invention:
A—2-ethylhexyl sulfosuccinate
B—Oxyalkylated phenolic resin prepared from nonyl phenol
C—Polyoxyalkylene glycol
D—Amine oxyalkylate
E—Dodecyl benzene sulfonic acid monoethanolamine salt
F—Polyol ester G—a conductivity improver comprising a polysulphone and a polyamine, the preparation of which is described in U.S. Pat. No. 3,917,466. Additive D is believed to contain approximately 20% w/w of active conductivity improving compounds The results are shown in table 1 and table 2:

TABLE 1

| Additive Composition ppm wt active | | | | | | Viscosity at 60° C. | % decrease in |
|---|---|---|---|---|---|---|---|
| A | B | C | D | E | F | cP | viscosity |
|  |  |  |  |  |  | 558 |  |
| 125 |  |  |  |  |  | 406 | 27% |
| 100 | 100 |  |  |  |  | 305 | 45% |
| 112.5 |  | 50 |  |  |  | 314 | 44% |
| 100 | 50 | 50 |  |  |  | 288 | 48% |
| 112.5 |  |  | 50 |  |  | 382 | 32% |
| 100 |  |  |  | 100 |  | 390 | 30% |
| 112.5 |  |  |  |  | 50 | 374 | 33% |
| 100 | 50 |  |  |  | 50 | 342 | 39% |

TABLE 2

| Additive Composition ppm wt active | | Viscosity at 40° C. | % decrease in |
|---|---|---|---|
| A | G | cP | viscosity |
|  |  | 1914 |  |
| 43.75 |  | 1820 | 5% |
| 43.75 | 1 | 1552 | 19% |
| 62.5 |  | 1544 | 19% |
| 62.5 | 1 | 1466 | 23% |

Example 2

The procedure of example 1 was repeated using a different Mexican crude oil having a viscosity without additives of 1100 cP at 60° C., an API gravity of 10 (SG 1.0), a water content of 3% and a solids content of <1% by volume. The results are shown in table 3 below.

TABLE 3

| Additive Composition ppm wt active | | | | | | Viscosity at 60° C. | % decrease in |
|---|---|---|---|---|---|---|---|
| A | B | C | D | E | F | cP | viscosity |
|  |  |  |  |  |  | 1100 |  |
| 45 | 30 | 30 |  |  |  | 930 | 16% |
| 75 | 50 | 50 |  |  |  | 785 | 29% |

The invention claimed is:

1. A method of reducing the viscosity of a crude oil having a basic sediment and water (BS&w) content of less than 10% by volume, the method comprising:
adding to the crude oil (i) a surfactant compound including at least two hydrophobic groups of formula (I);

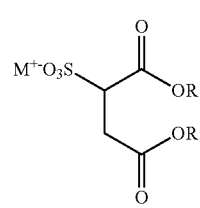

(I)

wherein each R is an optionally substituted hydrocarbyl group baying from 2 to 16 carbon atoms and $M^+$ is a hydrogen ion, an ammonium ion or a metal ion;
and (ii) an oxyalkylated phenolic resin; wherein the resultant mixture has a water content of less than 10 vol %.

2. The method according to claim 1, wherein the crude oil is a heavy crude oil.

3. The method according to claim 1, wherein the crude oil has an API gravity of less than 20 and a BS&W of less than 2%.

4. The method according to claim 1, wherein $M^+$ is sodium and each R is 2-ethylhexyl.

5. The method according to claim 1, further comprising adding one or more further components selected from the group consisting of:
(iii) polyoxyalkylene ethers;
(iv) aryl sulfonic acid compounds;
(v) alkoxylated amines;
(vi) polyol esters;
(vii) polysulfones; and
(viii) conductivity improvers.

6. The method according to claim 5 wherein component (ii) and component (iii) are added.

7. A method according to claim 1, wherein the viscosity of the additised crude oil is less than 90% of the viscosity of the unadditised crude oil.

8. A method according to claim 1, wherein one or more further additional components selected from the group consist of biocides, scale inhibitors, corrosion inhibitors, oxygen scavengers, hydrogen sulfide scavengers are added to the crude oil.

9. The method of claim 1, wherein each R is an unsubstituted alkyl group having from 2 to 16 carbon atoms.

10. The method of claim 1, wherein $M^+$ is an ammonium ion or a metal ion.

11. The method of claim 1 wherein each R is an unsubstituted alkyl, alkenyl, aralkyl, alkaryl or aryl group.

* * * * *

UNITED STATES PATENT AND TRADEMARK OFFICE
CERTIFICATE OF CORRECTION

PATENT NO. : 12,180,420 B2  
APPLICATION NO. : 18/085957  
DATED : December 31, 2024  
INVENTOR(S) : Ian Malcolm McRobbie, Joseph Sustayta and Luis Angel Ziga, Jr.

Page 1 of 1

It is certified that error appears in the above-identified patent and that said Letters Patent is hereby corrected as shown below:

In the Claims

Claim 1, Column 14, Line 3, should read --a basic sediment and water (BS&W) content of less than 10%--

Claim 1, Column 14, Line 19, should read --group having from 2 to 16 carbon atoms and $M^+$ is a--

Signed and Sealed this  
Thirteenth Day of May, 2025

Coke Morgan Stewart  
*Acting Director of the United States Patent and Trademark Office*